INVENTORS:
HAROLD A. McMASTER,
BY NORMAN C. NITSCHKE.
Owen + Owen
ATT'YS.

Jan. 3, 1967  H. A. McMASTER ETAL  3,295,843
METHOD AND APPARATUS FOR UNIFORMLY HEATING SHEET MATERIAL
Filed Feb. 17, 1964  9 Sheets-Sheet 9

FIG-15-

INVENTORS:
HAROLD A. McMASTER,
BY NORMAN C. NITSCHKE
Owen & Owen
ATT'YS.

United States Patent Office 3,295,843
Patented Jan. 3, 1967

3,295,843
METHOD AND APPARATUS FOR UNIFORMLY HEATING SHEET MATERIAL
Harold A. McMaster, Woodville, and Norman C. Nitschke, Perrysburg, Ohio, assignors to Permaglass, Inc., Woodville, Ohio, a corporation of Ohio
Filed Feb. 17, 1964, Ser. No. 345,297
9 Claims. (Cl. 263—7)

The present invention relates to apparatus for uniformly heating large pieces of sheet material, and more particularly, to apparatus for uniformly heating large pieces of plate glass.

An important object of the invention is the provision of a new and improved method and/or apparatus for providing uniform heat input to the surface of an object to be heated in which a chamber is provided having heat radiating surfaces which surround the object when positioned therein, in which a uniform heat input is supplied to each unit area of the heat radiating surfaces, and in which the heat radiating surfaces are shaped so that each unit area of the object to be heated when positioned within the chamber receives substantially the same amount of radiation from the heat radiating surfaces as do all other unit areas of the surface of the object to be heated.

Another object of the present invention is the provision of new and improved apparatus for heating large sheets of material such as glass more uniformly and with less distortion than has been possible with prior art apparatus.

Another object of the invention is the provision of a new and improved method of controlling the operation of a furnace in which all of the heating surfaces which "see" the heat load are caused to drop to a uniform low temperature when subjected to a non-uniform heat load and in which the heating surfaces are caused to increase uniformly in temperature thereafter as needed to raise the load to its desired temperature.

Another object of the invention is the provision of a new and improved furnace for heating loads, such as sheet material, the furnace comprising a chamber with heating surfaces facing and radiating heat to the sheet material and the radiating surfaces being divided into zones such that substantially all portions of the surfaces of each zone are exposed to substantially the same heat load as other portions of the same zone while the heat load on one zone may vary with respect to the heat load on another zone. In such a furnace, the zone being exposed to the greatest heat load preferably is a "master" zone and the other zones are "slave" zones. The furnace also has means controlling the temperature of the radiating surfaces of the "slave" zones so that they are at all times at the same temperature as the radiating surfaces of the "master" zone, so that the temperatures of the radiating surfaces of all the zones drop to a depressed temperature of the "master" zone when an object to be heated is introduced into the furnace and the temperatures of all of the zones increase identically as the temperature of the object approaches the desired final temperature.

Another object of the invention is the provision of a new and improved furnace for heating large sheets of material, having an internal chamber with radiating surfaces positioned in a vertically extending cylindrical arrangement to define the sides of said chamber, and in which the sheet material is supported generally diametrically of the chamber during its heating cycle.

Another object of the invention is the provision of a new and improved furnace of the above described type in which the sheet material and heating surfaces are rotated relative to each other during the heating of the sheet material.

Another object of the invention is the provision of a furnace having the control and operative features mentioned in which the furnace has a closed top and the work is inserted into and removed from the furnace through an access opening in its bottom thereby to minimize convection currents and their adverse effect upon heat control.

Another object of the invention is the provision of a new and improved furnace of the above described type having an inverted generally T-shaped work-support bar, the laterally extending portions of which can be lowered through a generally diametrically extending opening in the bottom of the furnace, while the upper end of the vertical leg of the work-support bar projects out of a centrally located opening in the roof of the furnace.

A further object of the invention is the provision of apparatus of the immediately above described type in which the laterally extending portion of the work-support bar is raised from a position beneath the furnace to a position adjacent the top of its heating chamber by means of a cable or other flexible pulling member which extends past the side of a pair of spaced apart abutments adapted to engage opposite sides of the flexible pulling member and rotated 180° relative to each other to double the flexible pulling member back upon itself and accelerate the support bar out of its lower position in accordance with a sinusoidal function and decelerate the support bar into its upper position as a sinusoidal function, and vice versa.

A still further object of the invention is the provision of apparatus of the immediately above described type in which the opposite end of the cable from the support bar is attached to a movable anchor which is in a position to prevent the support bar from reaching the lower position upon rotation of the abutments, and in which the support bar is gradually lowered into its final lower position by a slow controlled movement of the anchor.

Another object of the invention is the provision of a new and improved furnace of the type having cylindrically arranged sidewall radiating surfaces and an inverted T-shaped support bar and means for rotating the support bar about its vertical axis when it is in an upper position in the heating chamber.

A still further object of the invention is the provision of a new and improved furnace of one of the above described types having an inverted T-shaped support bar and which includes vertically extending guide rail means, and abutment means carried by the upper end of the T-shaped support bar which engages the guide rail means to align the laterally extending portion of the inverted T-shaped support bar and sheet material supported therefrom with an opening in the bottom of the furnace as the laterally extending portion is raised and lowered between its lower and upper positions.

A still more specific object of the invention is the provision of new and improved instrumentation for a furnace having various zones which are to be kept at the same temperature, and comprising: at least two thermocouples, one of which is located in the furnace zone having the highest heat load and the other of which is located in a zone having a smaller heat load, and which thermocouples are connected in series with each other in a manner such that the potentials generated oppose each other, and an instrument which senses current flow resulting from unbalance, through the series circuit, to control the temperature of the furnace zone having the smaller heat load.

Further objects and advantages will become apparent to those skilled in the art to which the invention relates from the following description of a preferred embodiment described with reference to the accompanying drawings forming a part of this specification, and in which:

FIGURE 2 is a vertical sectional view through the center of the heating chamber of the furnace taken along a plane parallel to the plane from which FIGURE 1 is taken;

FIGURE 3 is an enlarged, fragmentary view in elevation, and with parts broken away, taken from the position indicated by the line 3—3 of FIGURE 2, showing a typical arrangement of the electrical resistance heating elements of the furnace;

Although the invention may be otherwise embodied, it is herein shown and described as embodied in apparatus for heating large sheets of glass up to approximately 10 feet in width. The apparatus shown in the drawing comprises a cylindrically shaped furnace 20 that is supported approximately 12 feet above the floor 21 of a building by support structure 22. The sheets of glass to be heated are hung from a tong bar 23 (see FIGS. 1, 2 and 8) having closely spaced tongs 24 depending therefrom for holding the top edge of a sheet of glass "S" to be heated. The main horizontal member of the tong bar 23 is a pipe which is adapted to be conveyed from a loading position located at one side of the furnace to a position beneath the furnace by a shuttle conveyor 25 comprising a plurality of rollers 26 which engage the lower opposite sides of the tong bar 23. The rollers 26 along one side of the tong bar 23 are mounted on shafts which have sprokets 27 secured thereto and with which an endless chain 28 is engaged. The chain 28 also passes over a drive sprocket 29 that is driven by a drive motor 30. When the tong bar 23 is moved to a position directly beneath the furnace 20, it breaks the beam of light to a photoelectric cell 31 which stops the shuttle conveyor 25.

The tong bar 23 with a sheet of glass supported thereon is raised through a diametrically extending slot 32 (FIGS. 2, 4 and 8) in a flat floor 33 of the furnace 20 by an inverted T-shaped support 34 which has a cross bar 35 and a stem 36. The cross bar 35 is movable between a lower position beneath the floor 33 of the furnace and an upper position near the top of the furnace 20 with the upper end of the stem 36 moving through an axial opening 37 in a dome shaped roof 38 of the furnace 20. A pair of spaced depending arms 39 (FIG. 8) is secured to each end of the cross bar 35 of the support 34, each of the arms 39 having an inwardly extending ear 40. The ears 40 are spaced from the underside of the cross bar 35. Support brackets 41 are secured to the upper side of the tong bar 23 and are engageable with the ears 40 to lift the tong bar 23 and a sheet of glass carried thereby. In order to transfer a sheet of glass between the support 34 and conveyor 25, the support is moved downwardly beyond the point where the tong bar 23 engages the rollers 26, disengaging the ears 40 from beneath the support brackets 41. The slot 32 in the floor 33 of the furnace is closed by a hinged door 42 which is opened and closed by an air cylinder 43 to allow the cross bar 35 and a sheet of glass to move into or out of the furnace 20.

The floor 33 and domed top 38 of the furnace 20 and its cylindrical wall 44 are all fabricated from refractory material.

Figure 1:
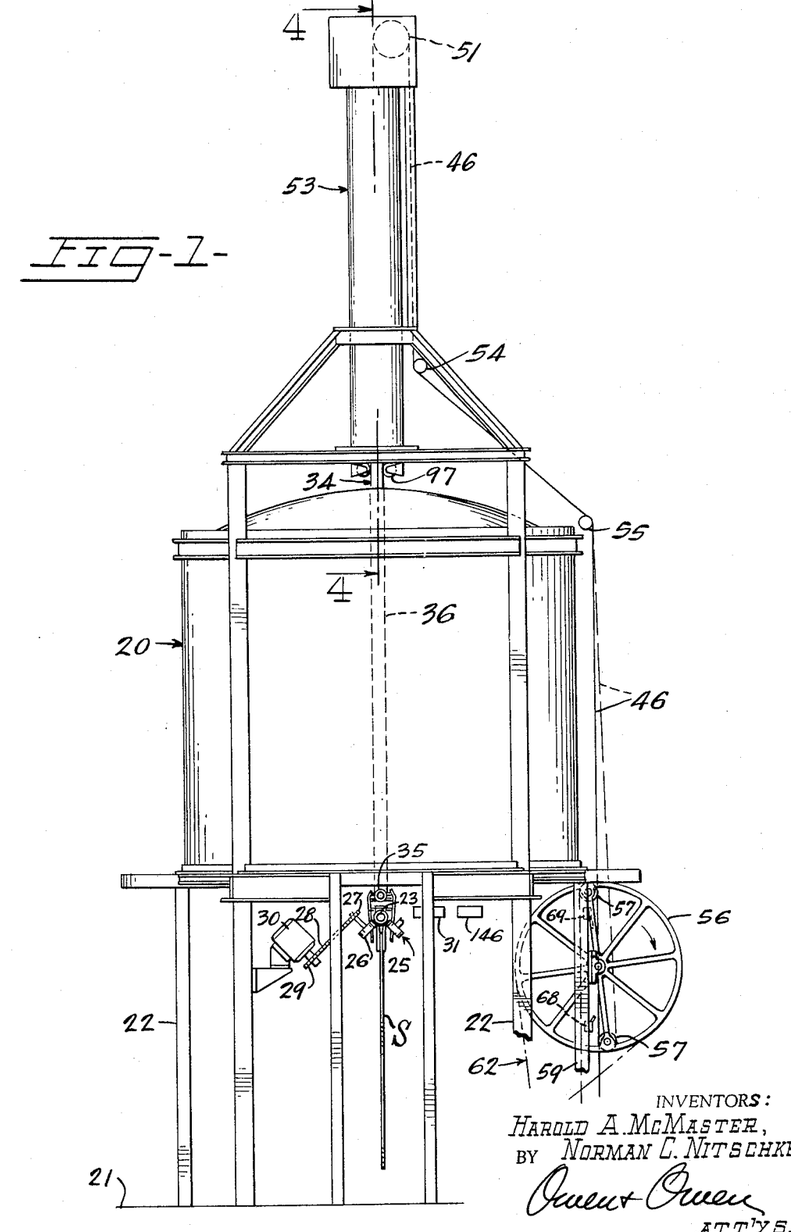
FIGURE 1 is a side view in elevation of a furnace embodying the present invention.
Figure 5:
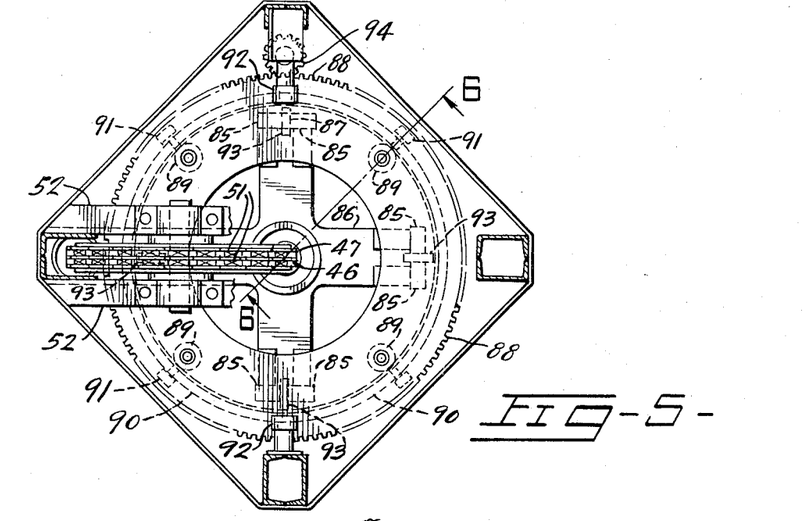
FIGURE 5 is a plan view taken from the position indicated by line 5—5 of FIGURE 4.
Figure 6:
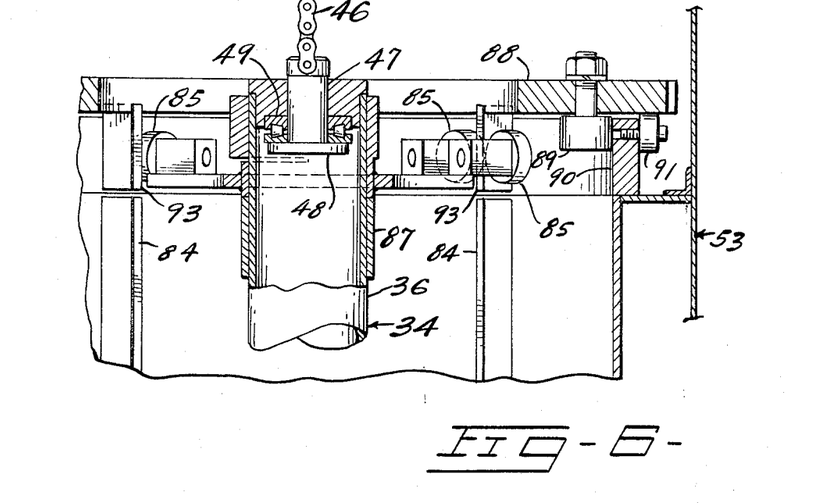
FIGURE 6 is a fragmentary, vertical sectional view taken along the line 6—6 of FIGURE 5 and shown on an enlarged scale.
Figures 7, 8:
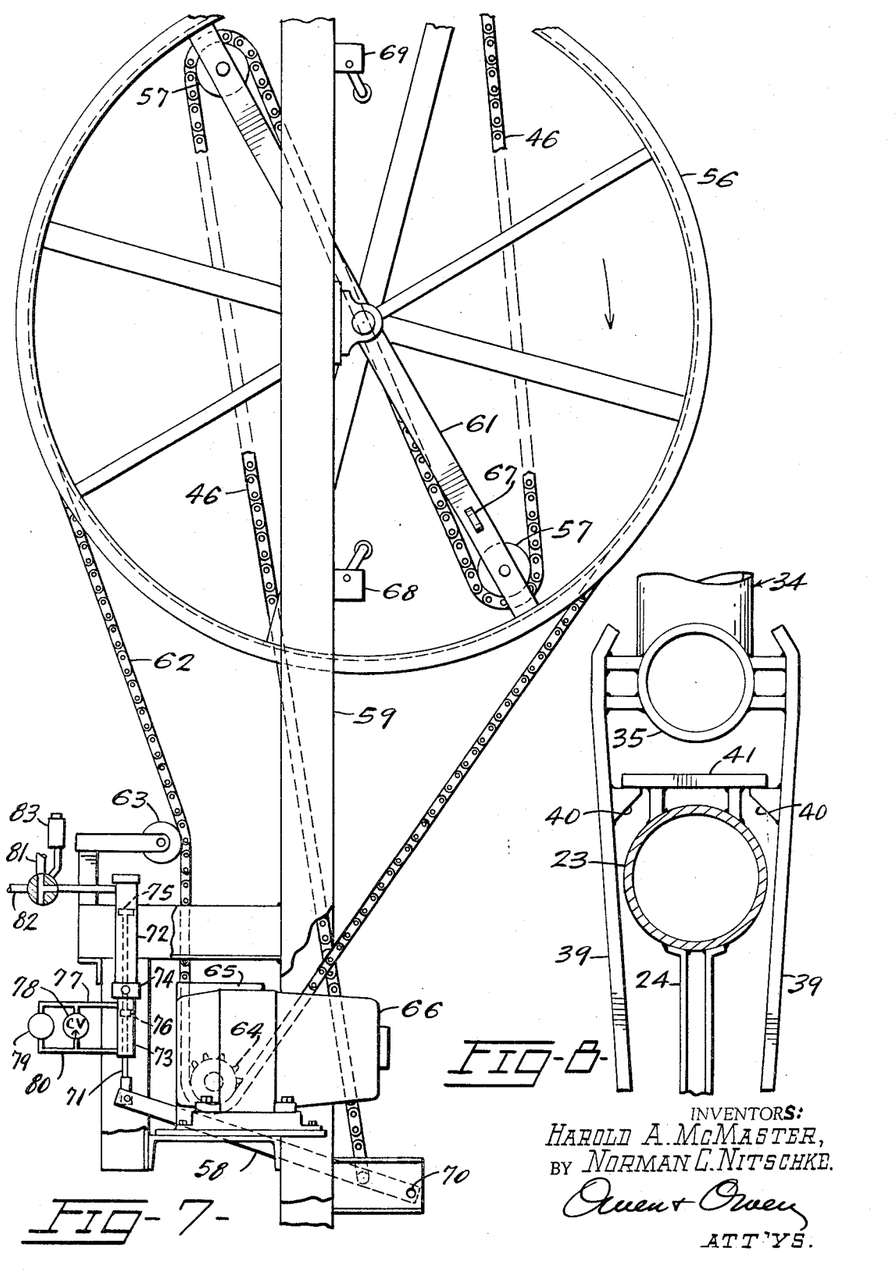
FIGURE 7 is a side view in elevation of the hoist structure indicated generally in the lower right hand side of FIGURE 1 shown on a greatly enlarged scale.
FIGURE 8 is a fragmentary, enlarged vertical sectional view taken along the line 8—8 of FIGURE 2.

The support 34 is raised and lowered between its loading position with the cross bar 35 beneath the furnace 20 (shown in FIG. 1) to an upper position (shown in FIG. 2) with the cross bar 35 adjacent the top 38 of the internal chamber 45 of the furnace 20 by a pair of parallel spaced chains 46 (FIGS. 1, 6 and 7). The chains 46 are connected to the upper end of a pin 47 having a flange 48 on its bottom end. A bearing 49 is positioned between the flange 48 and a plug 50 that is welded into the top end of the stem 36 of the support 34. The chains 46 extend upwardly over a pair of head sprockets 51 (FIGS. 1, 4 and 5) that are journaled on a cross beam 52 near the top end of a super structure generally indicated by the reference number 53 which is erected above the furnace 20. The chains 46 extend downwardly around guides 54 and 55 to an elevator wheel 56 and are engaged serially around the outer sides of two sets of pulleys 57 carried by the wheel 56. The lower ends of the chains 46 are connected to a lever 58 (FIG. 7).

The elevator wheel 56 is rotatably mounted on a pair of vertical beams 59 of the support structure 22. The pulleys 57 are positioned diametrically apart on spokes 61 of the elevator wheel 56. When the elevator wheel 56 is rotated to the position shown in FIG. 7, the chains 46 are doubled back over the pulleys 57, so that the chains 46 are "shortened" by a distance equal to approximately twice the radial spacing between the pulleys 57 to raise the support 34 from its lower, loading position to its upper position near the top of the furnace chamber 45. Conversely, when the elevator wheel 56 is rotated in a counterclockwise direction away from the position shown in FIG. 7, the chains 46 are "lengthened" to lower the support 34 to loading position.

The elevator wheel 56 is rotated by a chain 62 which passes over the elevator wheel 56, an idler 63 and a driving sprocket 64. The driving sprocket 64 is powered through a gear reducer 66 by a motor 65. A tab 67 is mounted on the spoke 61, in a position to alternately engage limit switches 68 and 69 to stop the clockwise and counterclockwise rotation, respectively, of the elevator wheel 56.

The lever 58 functions to control the speed of lowering of the support 34 onto the conveyor 25. The lever 58 is pivoted at one end by a pin 70 and the opposite end of the lever 58 is connected to a piston rod 71 of an air cylinder 72. The chains 46 are attached to the lever 58 intermediate its ends. The piston rod 71 extends through the air cylinder 72 and through a coaxial oil cylinder 73 mounted above the air cylinder 72. A gland 74 seals the ends of the cylinders 72 and 73. A piston 75 on the rod 71 is located in the air cylinder 72 so that air admitted to the top of the air cylinder 72 moves the lever 58 downwardly. A piston 76 on the rod 71 is located in the oil cylinder 73 and the opposite ends of the oil cylinder 73 are connected by a branched conduit 77. A check valve 78 is located in one branch of the conduit 77 to provide for rapid downward movement of the rod 71 and to restrict upward movement of the rod 71. A bleeder valve 79 is located in a second branch 80 of the conduit 77 which bypasses the check valve 78 to control the speed of the upward movement of the rod 71. Air from a supply line 81 is supplied to the upper end of the air cylinder 72 through a three-way control valve 82 that is actuated by a solenoid 83 during downward movement of the support 34 so as to "shorten" the chains 46 and to result in the support 34 not depositing the tong bar 23 on the conveyor rollers 26 when the elevator wheel 56 completes its rotation in a counterclockwise direction. After the tab 67 contacts the limit switch 69, the solenoid 83 is actuated to shift the control valve 82 to its exhaust position to allow the weight of the support 34 and the sheet of material supported thereby to pull on the chains 46 to raise the lever 58 and piston rod 71 causing hydraulic flow through the bleeder valve 79. This settles the support 34 slowly into its lower position and deposits the tong bar 23 gently on the conveyor rollers 25.

Figure 4:
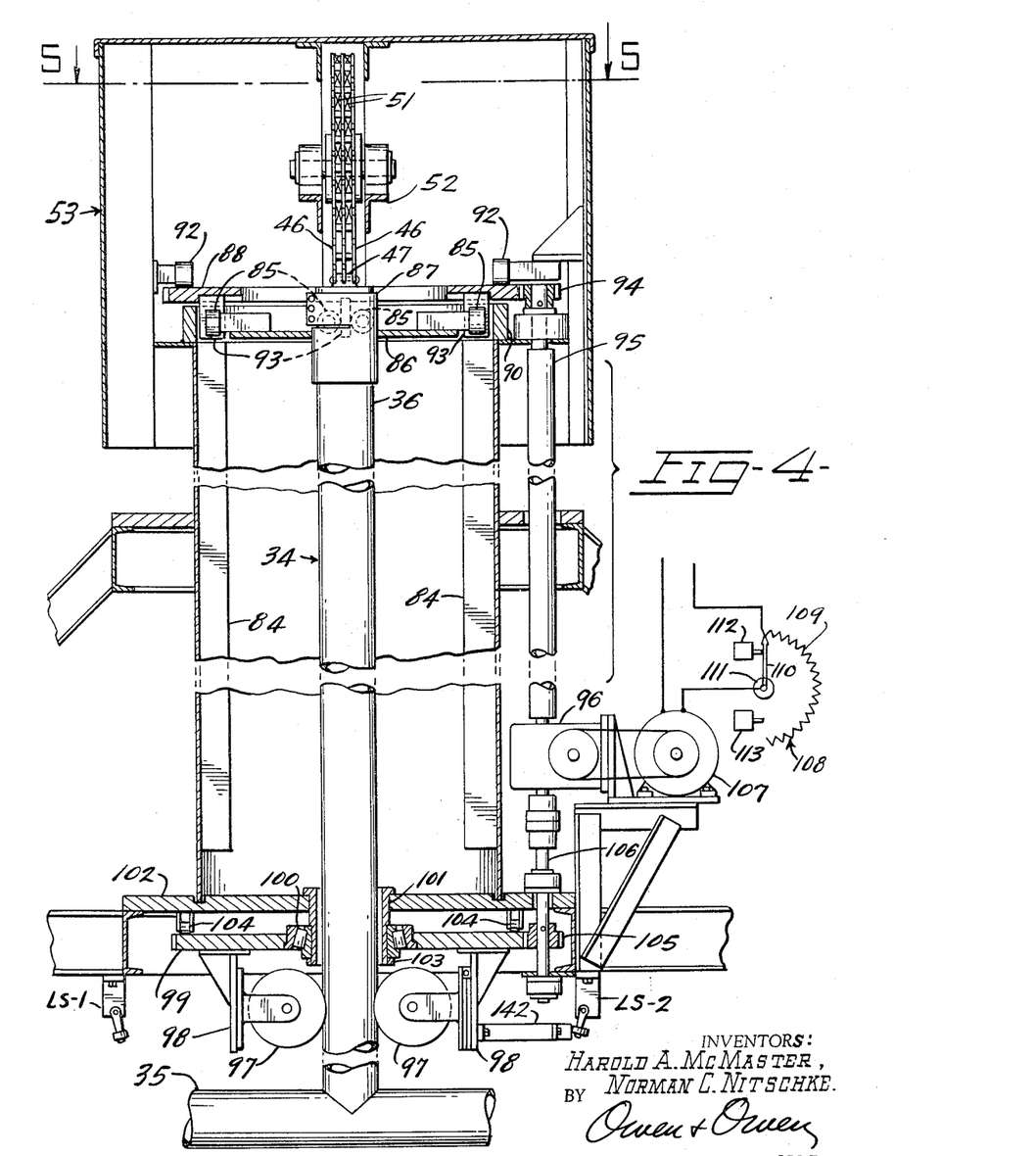
FIGURE 4 is a fragmentary, vertical sectional view taken along the line 4—4 of FIGURE 1 and shown on an enlarged scale.

The cross bar 35 of the support 34 is held in alignment with the slot 32 in the floor 33 of the furnace 20 as it is moved between its upper and lower positions by four vertically extending, fixed guide rails 84, and four pairs of guide rollers 85 (FIGS. 4, 5 and 6). The pairs of guide rollers 85 are mounted on the ends of a cross 86 and spaced apart radially so as to roll against opposite sides of the guide rails 84. The center of the cross 86 is welded to a split, tubular clamp 87 that is clamped on the upper end of the vertical stem 36. At the uppermost position of the support 34, the cross 86 and guide rollers 85 are above the upper ends of the guide rails 84 (see FIG. 4) so that the support 34 and a sheet of material carried thereby can be rotated in the furnace chamber 45.

The support 34 is rotated when in its upper position by means of a ring gear 88 which is guided for rotation about the axis of the support 34 by four rollers 89 (FIG. 6) carried on vertical axes by the ring gear 88 and engaged with the inner edge of a stationary tubular track 90 (FIGS. 5 and 6). The track 90 is supported by the super structure 53. The ring gear 88 is supported above the track 90 by four rollers 91 mounted on horizontal axes on the track 90 and is held down by a pair of opposed rollers 92 (FIG. 4) having horizontal axes and mounted on branches of the super structure 53. Four stub rails 93 are secured to the underside of the ring gear 88 and are angularly spaced to align with the fixed guide rails 84 when the ring gear 88 and support 34 are stopped in position for raising and lowering. The pairs of rollers 85 embrace the stub rails 93 when the support 34 is in uppermost position, as shown in FIG. 4. The ring gear 88 is rotated by a pinion 94 pinned on the top end of a drive shaft 95, the lower end of which is driven by the vertical shaft of a gear reducer 96. Rotation of the shaft 95 rotates the ring gear 88, the stub rails 93 transferring the force to the guide rollers 85 which are mounted on the cross 86 and thus to the clamp 87 and the stem 36 of the support 34.

The stem 36 is guided for vertical movement by a pair of grooved surface guide rollers 97. The guide rollers 97 are rotatably supported by brackets 98 fixed to the bottom of a lower ring gear 99. The center of the ring gear 99 is carried by a thrust bearing 100 which in turn is supported by a flanged sleeve 101 which surrounds the stem 36. The sleeve 101 rests in a central bore of a fixed horizontal support plate 102 carried by horizontal members of the super structure 53. The lower end of the sleeve 101 is threaded to receive a threaded collar 103 which is tightened against the bottom of the inner race of the thrust bearing 100 to hold the ring gear 99 up against leveling rollers 104 that are mounted on the underside of the support plate 102. To prevent sliding of the guide rollers 97 around the stem 36, the ring gear 99 is rotated in unison with the upper ring gear 88 by a pinion 105 pinned on a shaft 106 coupled to a depending shaft of the gear reducer 96 and rotated in unison with the upper shaft and the upper drive shaft 95.

The gear reducer 96 is driven by a variable speed direct current motor 107, the speed of which is controlled by a variable rheostat 108 commonly called a "variac unit". Direct current voltage is supplied to the resistance unit 109 and motor 107. A slide 110 is electrically connected to the motor 107 and slides along the resistance element 109 to vary the voltage to the motor 107. The position of the slide 110 is changed by a reversible control motor 111 whose rotation in one direction is stopped by a limit switch 112 when the rheostat 108 provides maximum voltage, and whose rotation in the opposite direction is stopped by a limit switch 113 when the rheostat 108 provides minimum voltage.

Figures 2, 3:
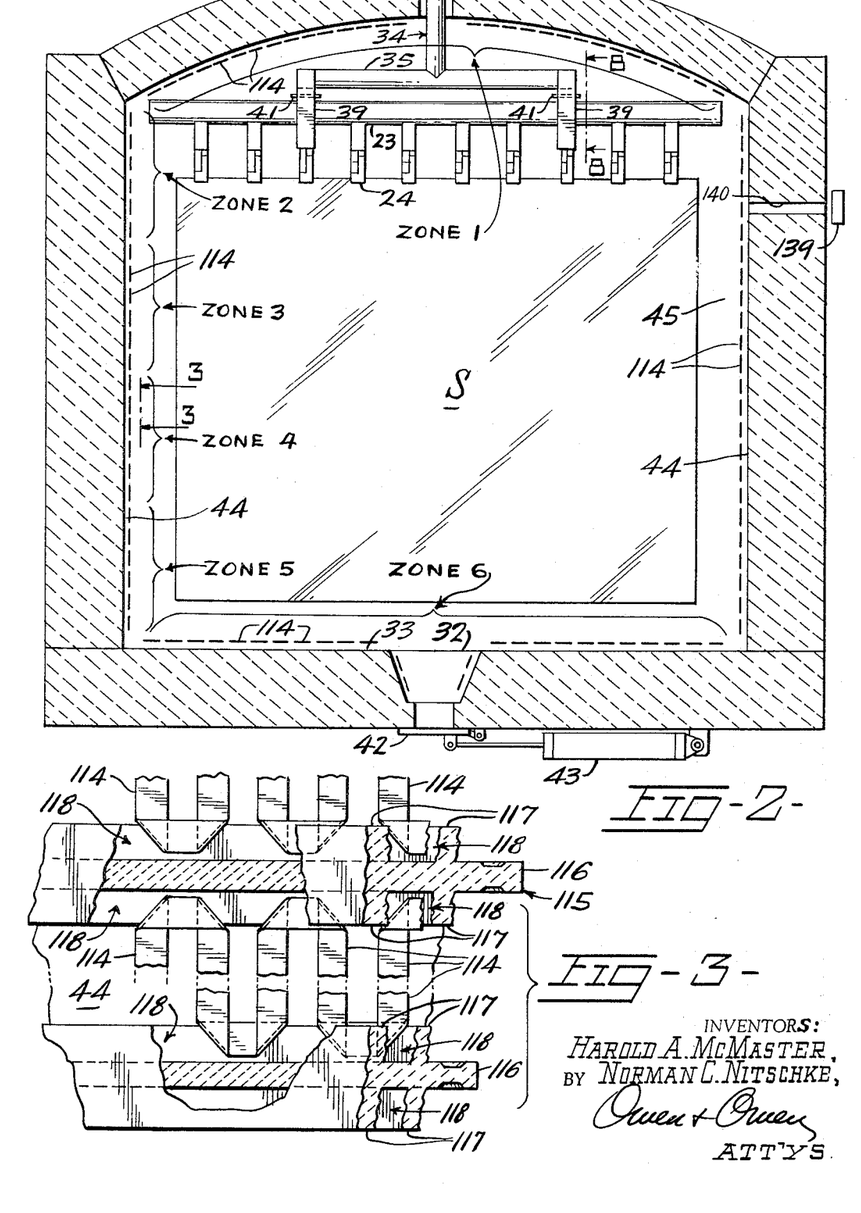
Figures 11, 12, 13:
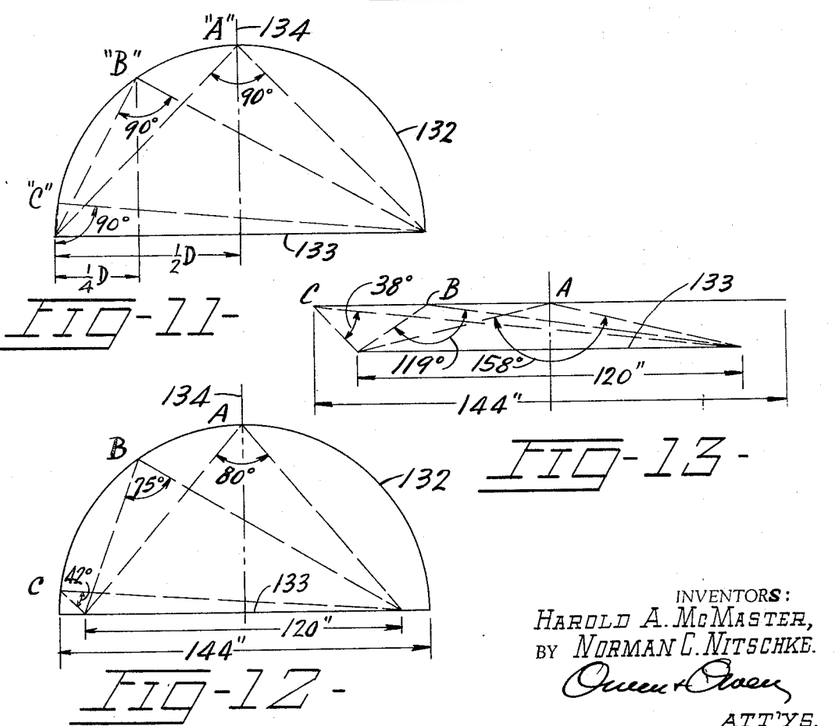
FIGURE 11 is a diagrammatic view of the geometry involved in heating a sheet of material extending diametrically across a heating chamber of cylindrical cross section having a diameter equal to the width of the sheet.
FIGURE 12 is a view similar to FIGURE 11 but showing the geometry involved in heating a sheet of material of a width less than the diameter of a cylindrical chamber in which it is heated.
FIGURE 13 is a diagrammatic view showing the heating of a sheet of material in a narrow rectangular furnace chamber having a width greater than the width of the sheet of material; the particular relative dimensions being, for example, a sheet 10 feet wide in a chamber 2 feet by 12 feet in size.

The internal heating chamber 45 of the furnace 20 is heated by heat radiating elements 114 (FIGS. 2, 3 and 11). The heating elements 114 which extend around the walls of the furnace are arranged in a cylinder around the inner walls of the furnace and comprise approximately fifty per cent of the surface area of the cylinder which they define. In the present embodiment, each of the radiating elements 114 is bent from a flat strip of metallic resistance material into the shape shown in FIGURE 3, and even though localized hot spots may result where the strips overlap, these spots are so relatively small that substantially uniform heat output per square foot of the wall area results. Each heating element 114 on the sidewalls of the heating chamber 45 extends around the chamber to cover all but about five inches of its periphery where suitable electrical connections to the heating elements 114 are made so that the heating elements provide substantially uniform heat input per unit area of the surface of the heating chamber 45. In the particular furnace shown in the drawings, the walls 44 of the furnace are also cylindrical and are 12 feet in diameter. The inner surface of the dome shaped roof is also formed on a 12 foot radius.

Figure 10:
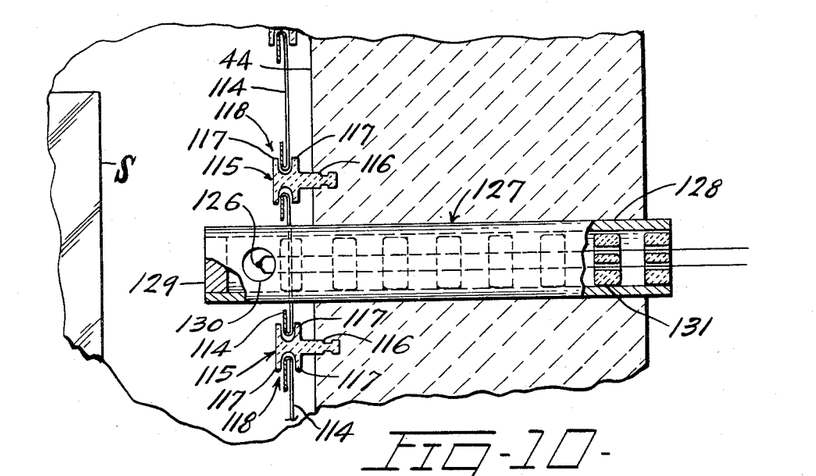
FIGURE 10 is a fragmentary, detailed view taken along a vertical radial plane of the furnace and showing a typical shielded thermocouple used to sense the temperature of the heating elements in the various zones of the furnace.

The heating elements 114 are supported inwardly of the face of the brickwork by horizontally extending arcuate ceramics 115 (see FIG. 10) which have horizontal wings 116 that are embedded in the brickwork in end-to-end relationship. Each of the individual ceramics 115 comprises a wing 116 which projects generally normally out of the brickwork, and two pairs of vertically extending, horizontally spaced ribs 117 which form arcuate grooves 118 on the tops and bottoms of the ceramics 115, into which the upper and lower edges of the heating elements 114 are positioned to hold the heating elements 114 in place. The heating elements 114 radiate heat in all directions. The heating elements are arranged to define a cylinder, of which they form approximately 50 percent of the surface area, and can, therefore, be thought of as defining the sidewalls of the chamber 45. The heat that is radiated from the backside of the elements 114 is reradiated from the brickwork of the furnace through the openings between the heating elements 114. If the heat loss through the brickwork is negligible, all of the heat radiated to the brickwork will be reradiated through the openings between the heating elements 114 so that the surfaces of the brickwork need not be cylindrical. In the preferred embodiment, however, the heating elements are supported a uniform distance from the brickwork so that the surface of the brickwork is also cylindrically shaped. The heating elements 114, which define the cylindrical sidewalls of the chamber 45, are divided into four zones (FIG. 2), each having six circumferentially extending rows of heating elements 114 each row of which comprises one electrical circuit. The inside of the roof 38 is similarly covered with circular rows of heating elements 114 which form a single zone comprising nine circuits. The floor 33 of the furnace 20 is also covered with heating elements 114 which are divided into six circuits. As in the case of the sidewall, the heating elements 114 on the roof 38 and on the floor 33 are so spaced that substantially uniform heat output per square foot of area results.

The nine circuits of heating elements on the roof 38 will hereafter be designated as heating "Zone 1"; the four zones of heating elements covering the sidewalls will be designated "Zones 2–5," in consecutive order from top to bottom; and the six circuits of heating elements on the floor of the furnace will be designated as "Zone 6".

Because the voltage of each phase of any three-phase system may vary as a result of unequal loads being applied to the various phases, all of the heating elements are arranged to have substantially the same length of ribbon. In addition, each zone of the heating elements consists of multiples of three rows of heating elements 114, and consecutive rows of heating elements are energized by the various phases in a particular consecutive order which repeats itself. For example, in each of Zones 2–5, the top and fourth rows of heating elements 114 are supplied by a first phase; the second row from the top and second row from the bottom of each zone is supplied by a second phase; and the third and lower rows of heating elements 114 are supplied by the third phase. Any difference in the quantity of radiation produced in the individual heating elements as a result of a difference in input energy due to differences in phase voltage is therefore averaged out over the total area of a radiating zone.

Figure 9:
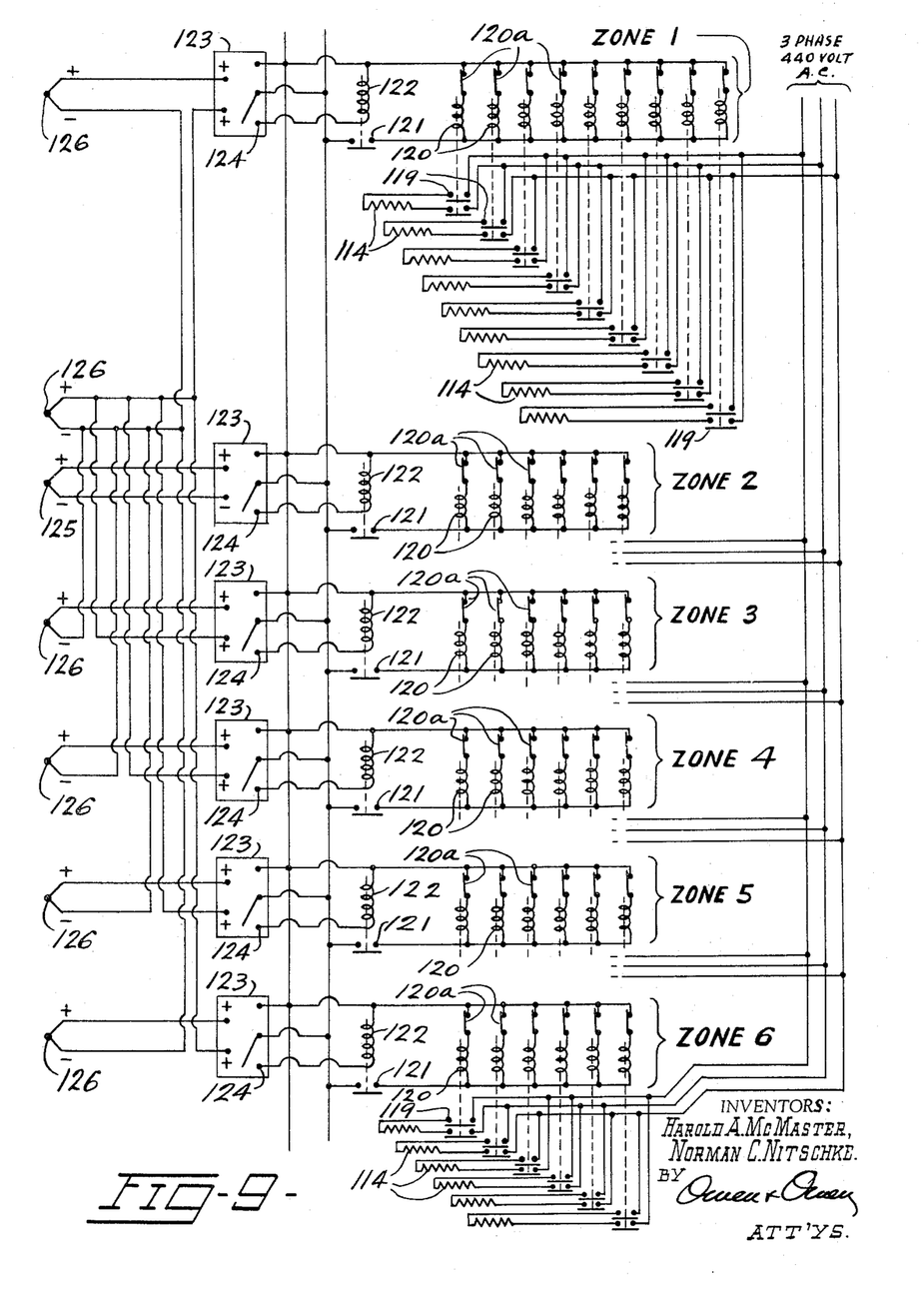
FIGURE 9 is a schematic wiring diagram for the instrumentation used to control the temperature of the various zones of the furnace indicated in FIGURE 2.

Each of the individual circuits of each heating zone is supplied with electricity from one phase of a three-conductor, three-phase 440 volt A.C. circuit, as indicated diagrammatically at the top of FIGURE 9 with respect to Zone 1. Flow of electricity to each individual heating circuit 114 is controlled by a double pole, normally open circuit switch 119 that is closed upon energization of a relay 120 and by a manually operable lockout switch 120a for each relay 120. One circuit switch 119 and one relay 120 is provided for each heating circuit. All of the relays 120, which control all of the circuits in each zone, are connected in parallel and are controlled by a single pole, normally open zone switch 121, which is closed upon energization of a relay 122 to energize the control relays 120 of that zone. The relay 122 for each zone is in turn controlled by a respective commercially available controller 123 which is actuated in response to signals from a thermocouple 125 or 126, as the case may be, and which closes a switch 124 when the potential from the thermocouple 125 or 126 drops below a predetermined level.

According to the invention, one of the zones of the furnace is selected to be a "master zone" and the other zones are "slave zones," the temperatures of which are controlled relative to the temperature of the "master zone." In the preferred embodiment of the invention described herein, the "master zone" is selected as that zone subject to the greatest heat load, but any other zone could be chosen as the "master zone" providing it were subject to a sufficiently large load or had a sufficiently low heat input that all "slave zones" could maintain temperatures identical to it during the reheating portion of the cycle. To create a "master zone" whose rate of regaining temperature when exposed to a load is less than that of the other zones, one or more switches 120a can be opened until the ratio of heat input to the zone relative to the heat load on the zone is less than that of the other zones.

In the furnace shown in the drawings, the heating elements of Zone 2 are positioned at a level generally the same as the tong bar 23 and the top portion of the sheet of glass to be heated, so this zone is subject to the greatest heat load, whether or not a sheet of glass is in the furnace. Zone 2 may, therefore, be referred to as the "master zone," and its controller 123 is connected to a single thermocouple 125. Zones 1, 3, 4, 5 and 6 always are subject to less heat load than is the "master" Zone 2 and these zones may be referred to as "slave" zones. Identical shielded thermocouples 126 in each of the zones, "see" only the temperature of the resistance elements 114 in their respective zone. The thermocouple 126 in Zone 2 will be referred to as the "master" thermocouple and the remaining thermocouples 126 will be referred to as "slave" thermocouples. Each of the "slave" thermocouples is connected in series with the "master" thermocouple and each "slave" thermocouple 126 is connected so that the potential developed by the "slave" thermocouple is in opposition to that of the "master" thermocouple. From FIGURE 9, it will be seen that the "slave" thermocouples 126 are arranged in parallel with each other and that all are in series with the "master" thermocouple 126. When the temperature of a "slave" zone is at or above the temperature of the "master" zone, no current flows to the controller for the "slave" zone, so that the heating elements 114 for the "slave" zone are not energized. When the temperature of the "slave" zone drops *below* that of the "master" zone, the controller 123 for the "slave" zone closes its switch 124 to supply electricity to its heating circuit elements 114 until its temperature is equal to that of the "master" zone.

It will be understood that the diagram of FIGURE 9 is not complete in that only three of the nine switches 119 and circuits of heating elements 114 for Zone 1 are shown, and that six solenoids 120, switches 119 and circuits of heating elements 114 are actually controlled by the switches 121 of each of the other zones. By means of the arrangement shown in FIGURE 9, all of the heat radiating surfaces of the furnace are caused to drop until they reach a temperature equal to the lowered temperature of the "master" zone which results when a heat load is introduced into the furnace, and the heat radiating surfaces are thereafter caused to rise in temperature uniformly as the heat load approaches the temperature to which it is to be heated.

Each of the thermocouple structures 127 which are used to sense the temperature of the heat radiating elements 114 in each zone comprises a tube 128 (see FIG. 10) which extends through the brickwork and inwardly of the heating elements 114. The inner end of the tube 128 is closed off by a refractory plug 129, and an opening 130 is formed in the sidewall of the tube 128 between the refractory 129 and the heating elements 114. The junction of each thermocouple 126 is positioned opposite the opening 130 of the tube 128 in which it is positioned so as to "see" only the heating elements 114 of its zone, and the wires of the thermocouple are threaded through insulators 131 positioned in the tube 128 and lead to a point outside of the tube where they are connected to the controlling instrument 123 for that zone. FIGURE 11 illustrates the particular advantages that are obtained by the use of cylindrically shaped heat radiating surfaces 132 for the heating of sheet materials. A sheet of material, indicated by the line 133, is placed diametrically across cylindrically shaped radiating surfaces 132. Point "A" is located at the intersection with the surface 132 of a line 134 perpendicular to the center point of the diameter of the furnace with the surface 132. Point "B" is located at the intersection with the surface 132 of a line normal to the diameter of the furnace at a point one-quarter of the distance across the diameter of the furnace. Point "C" is located at a position on the surface near the intersection of the diameter with the wall of the furnace. From FIGURE 11, it can be seen that when the sheet to be heated extends all the way across the furnace, all points on the circumference of the furnace "see" a 90° width of area to be heated. Because the furnace wall is circular, each point actually "sees" 180°, of which the width of area to be heated is 90° and the remaining 90° is composed of other wall points between which heat is constantly being exchanged to further equalize the temperature by reradiation.

It is a principle that the quantity of radiation received by a plane surface from a point of radiation is proportional to the cosine of the angle of incidence at which the radiation "strikes" the plane surface. In other words, the surface will intercept rays in proportion to its apparent area as viewed from the source of energy. In the arrangement of FIGURE 11, the apparent area of the surface 133 is the same viewed from every point on the surface 132. Furthermore, the total energy received by a unit of area of surface 133 will be the integral or summation of energy received from small increments of angle throughout 180° to which the surface to be heated is exposed. If the radiating surface 132 is at uniform temperature at all points, any small increment of angle of the surface 132, as viewed from the surface 133 to be heated, contains the same amount of energy as all other identical small increments of angle and the summation over 180° for one small area of the surface 133 is the same as that for any other area of 133 and hence, all areas of 133 will be heated uniformly. In the arrangement shown in FIGURE 11, all points on the radiating surface 132 will be exposed to substantially the same heat load and all points of the material 133 will be heated to substantially the same temperature.

While the foregoing explanation relates to a horizontal planar section of a vertical cylindrical furnace as shown in FIGURE 11, the same would also apply to a vertical section in a cylindrical furnace having a horizontal axis. Indeed, application of the principles in both directions would result in a spherical furnace wall which would then be an integrating sphere in which absolute uniformity of heat emission would result. Each unit area on surface 133 would then be exposed to a solid angle of 180° of radiating surface containing the same heating ability as the 180° solid angle to which any other unit of area is exposed. Because the radiating surface is not a point source, but is an extensive area, the heat received by any point on or any small unit of area of the surface of the load from any small increment of solid angle depends only on the average temperature of the radiating surface subtended by that solid angle and not on the distance to the radiating surface and the inverse square law for point source radiation does not apply.

The arrangement shown in FIGURE 11 is largely theoretical since it is impractical to have the sheet of material being heated extend all of the way across the major diameter of a cylindrical or spherical radiating surface. FIGURE 12 of the drawings shows the angles subtended by a 10 foot wide sheet of material with respect to the points "A," "B" and "C" of the furnace of FIGURE 11. In the arrangement shown in FIGURE 12, an 80° angle of radiation from point "A" is distributed over the width of the material being heated; a 75° angle of radiation from the point "B" is distributed over the width of the material being heated; and a 42° angle of radiation from the point "C" is distributed over the width of the material being heated. Point "C," therefore, has less heat load and will become hotter than point "B," while point "B" has less heat load and will become hotter than point "A." The region adjacent the side edges of the material 133 are therefore exposed to higher radiating temperatures than is the center portion of the material 133, so that some variation in temperature occurs across the width of material heated by the arrangement shown in FIGURE 12.

By rotating the material 133 about the vertical center line of the radiating surface 132, all points around the surface 132 are sequentially subjected to the varying degrees of exposure described for the points "A," "B" and "C" so that all points spaced circumferentially around the surface 132 tend to approach the same temperature. Vertical uniformity of temperature is achieved by the "master"-"slave" zone arrangement discussed above. Hence, although the heating chamber is not a sphere, all surfaces are maintained at the same temperature and all 180° solid angles contain the same ability to heat any area of the load.

A very definite improvement exists, however, in the arrangement shown in FIGURE 12 over that of a conventional furnace having a rectangular cross section with sides generally paralleling the sheet of material 133 being heated. The furnace shown in FIGURE 13 has a cross sectional area two feet deep and twelve feet wide. As in the arrangement shown in FIGURE 12, the material being heated is ten feet wide, and points "A," "B" and "C" are spaced laterally by the same distances as in FIGURES 11 and 12. In the furnace shown in FIGURE 13, a 158° angle of radiation from point "A" is distributed over the width of the heat load; a 119° angle of radiation from point "B" is distributed over the same width; and a 38° angle of radiation from point "C" is distributed over the same width. Point "C" in FIGURE 13 is therefore subjected to less heat load and is hotter than is point "C" of FIGURE 12; point "B" of FIGURE 13 is subject to more heat load and is cooler than point "B" of FIGURE 12; and point "A" is subject to a still greater heat load and is cooler than is point "A" of FIGURE 12. The difference in temperature between the center and edges of the heat load 133 in the arrangement in FIGURE 13 is considerably greater than that produced by the arrangement of FIGURE 12. In addition, of course, and contrary to the arrangement in FIGURE 11, none of points "A," "B" or "C" in FIGURE 13 can exchange radiation directly, as do the points "A," "B" and "C" in FIGURE 11, which, of course, helps to equalize the temperature of the points "A," "B" and "C" in FIGURE 11.

If the rectangular furnace of FIGURE 13 were made square, and the sheet material 133 were revolved about the vertical center line of the furnace, a more nearly uniform heating of the sheet material 133 would be obtained, but it would not be as uniform as is produced by the arrangement shown in FIGURE 12.

Deviations from a cylindrical shape, as for examples, a barrel shape, an ellipsoid or similar approach to a cylindrical or, ultimately, a spherical shape, also results in improved uniformity of tempereature of the radiating surfaces by more nearly uniform heat load exposure and reradiation.

Figure 14:
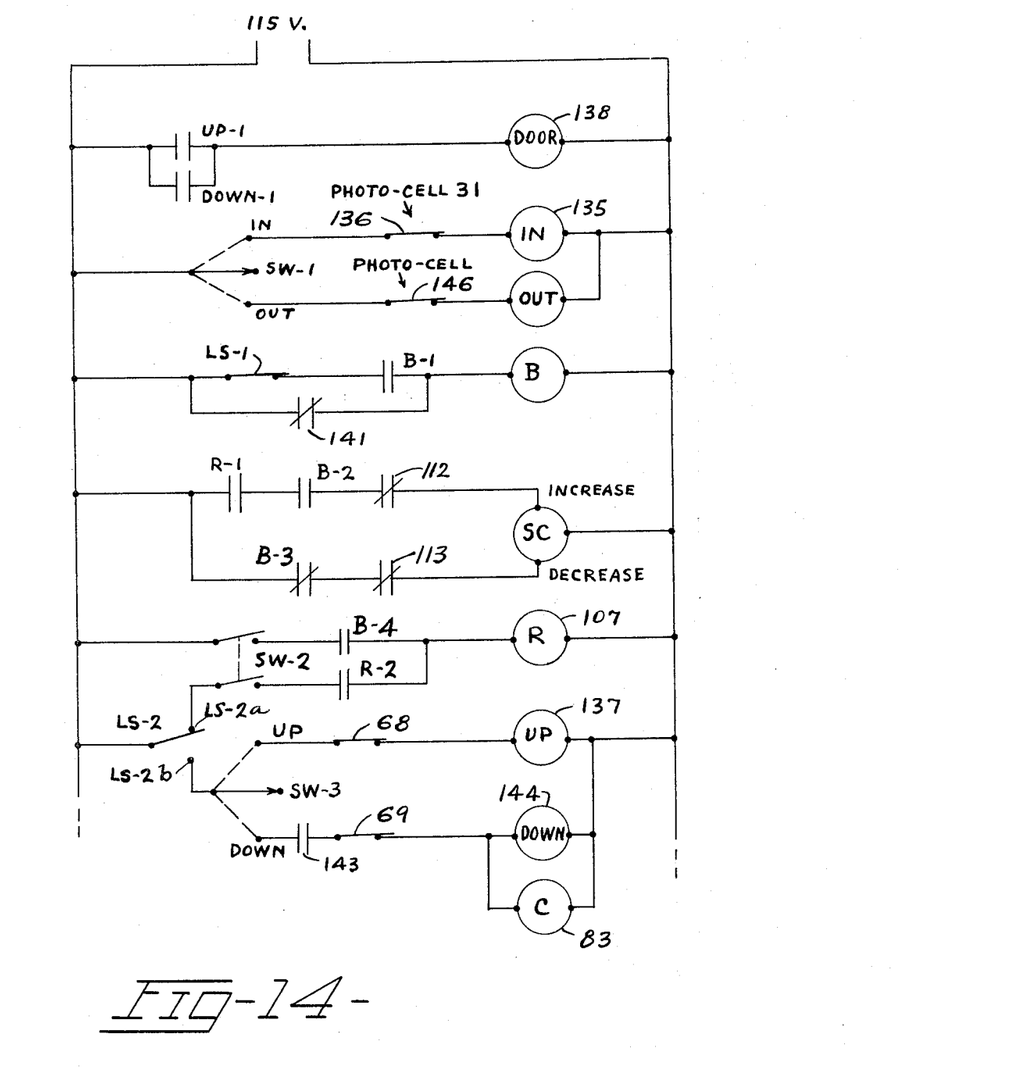
FIGURE 14 is a schematic wiring diagram for the material handling apparatus of the furnace.

The operation of the embodiment of the invention particularly disclosed herein will now be described with reference to the wiring diagram shown in FIGURE 14. The limit switch LS-2 is shown in its normal position in FIGURE 14 wherein it makes contact with contact LS-2a. As previously explained, however, the support 34 is stopped with its cross bar 35 in alignment with the slot 32 when limit switch LS-2 is tripped to make contact with contact LS-2b. After an operator loads a sheet of glass on the tong bar 23, he moves a switch SW-1 to the "in" position to energize the "in" solenoid 135 for the motor 30 through the normally closed switch 136 of the photoelectric cell 31. Solenoid 135 causes motor 30 to be rotated in a direction which actuates chain 28, sprockets 27 and rollers 26 in a direction to move the tong bar 23 to a position directly underneath the slot 32. When the tong bar 23 is properly located beneath the slot 32, it interrupts the light to photoelectric cell 31 to open the switch 136. The operator then moves switch SW-3 to its "up" position to close a circuit through normally closed limit switch 68 and the "up" solenoid 137 which causes motor 65 to actuate speed reducer 66 and chain 62 in a manner to rotate elevator wheel 56 clockwise. When solenoid 137 is energized, it closes contact UP-1 to energize door relay 138 to supply air to air cylinder 43 to hold door 42 open. Clockwise rotation of elevator wheel 56 "shortens" chains 46 to raise the support 34. During upward movement of the support 34, rollers 85 roll along guide rails 84 to assure that material attached to the tong bar 23 rises vertically through the slot 32. When limit switch LS-2 was tripped, stub rails 93 were positioned directly over guide rails 84. Rotation of elevator wheel 56 continues until rollers 85 engage the stub rails 93 and the support 34 is in the upper position shown in FIGURE 4. When the support 34 reaches its upper position, tab 67 on elevator wheel 56, trips limit switch 68 to open the circuit to the "up" solenoid 137 to stop the motor 65. The elevator wheel, in cooperation with the chains 46, accelerates the tong bar 23 out of its lower position as a sinusoidal function and decelerates the tong bar 23 into its upper position as a sinusoidal function. Conversely, it accelerates the tong bar 23 out of its upper position as a sinusoidal function and decelerates the tong bar into its lower position as a sinusoidal function.

An optically actuated, temperature responsive controller 139 (FIG. 2) is aligned with a viewing port 140 through the wall of the furnace to read the temperature of the glass sheet. The controller 139 has normally closed contacts 141 which are opened when the glass temperature reaches 1000° F. When a glass sheet is first moved into the furnace, of course, its temperature is below 1000° F. so the contacts 141 remain closed to energize relay "B." When relay "B" is energized, it closes contacts "B–1," "B–2" and "B–4" and opens normally closed contacts "B–3." The operator then closes switch SW–2 to complete a circuit through contacts "B–4" and starter relay "R" to energize the motor 107 through the variac unit 108. Motor 107 drives the gear reducer 96, shaft 95 and ring gear 88 to start rotation of the support 34. When the relay "R" of the starter for the motor 107 is actuated, it closes normally open contacts "R–1" and "R–2." Since the variac unit was previously in its high resistance state, causing slowspeed operation of the motor 107, closing of contacts "B–2" energizes motor 111 to slowly move the slide 110 toward its high speed position to increase the speed of rotation of the support 34 until the slide 110 opens limit switch 112. The support 34 and sheet of glass which it supports is, therefore, rotated within the furnace at its normal speed of approximately 12 r.p.m.

When the sheet of glass was raised into the furnace, the cold tong bar 23 and the glass load caused the temperature of the radiating elements 114 in Zone 2 to drop below the temperature of the other zones. The instrument 123 for Zone 2 causes its switch 124 to be closed, closing relay switch 121 to in turn activate its six relays 120, to close switches 119 to each of its six heating elements 114. Since less heat load is positioned opposite the heating elements of the other heat zones, the temperature of Zones 1, 3, 4, 5 and 6 is above that of Zone 2. The thermocouples for Zones 1, 3, 4, 5 and 6, therefore, generate a greater potential than does the "master" thermocouple 126 for Zone 2, so that the controllers 123 for Zones 1, 3, 4, 5 and 6 are not actuated at this time. When the temperatures of Zones 1, 3, 4, 5 and 6 drop below that of Zone 2, the controllers for Zones 1, 3, 4, 5 and 6 close their switches 124 and 121 to in turn close their switches 119 to energize their heating elements 114. The temperature of all the zones are therefore kept substantially identical, and the temperature of Zones 1, 3, 4, 5 and 6 is kept from exceeding that of Zone 2.

When the temperature of the glass reaches 1000° F., the controller 139 opens its contacts 141. Since "B–1" is closed, and limit switch LS–1 is normally closed, relay "B" remains energized until dog 142 momentarily opens LS–1 (see FIG. 4) to cause relay "B" to drop out. This opens contacts "B–1," "B–2" and "B–4" and allows "B–3" to become closed. Switch LS–1 is located approximately 180° of rotation from LS–2, which is located so that it is engaged when the horizontal leg 35 of the support 34 lines up with the slot 32. After LS–1 is opened and "B–3" closes, motor 111 rotates to slow down motor 107 gradually. When LS–2 is tripped by the dog 142, it moves out of engagement with contact LS–2a into contact with LS–2b to open the circuit through contact "R–2" to relay "R." This causes motor 107 to stop and contacts "R–1" and "R–2" to again open. When motor 107 stops, the stub rails 93 are aligned with the guide rails 84.

The operator then moves switch SW–3 to the "down" position. However, the glass does not move until it reaches a temperature of 1200° F. which causes the controller 139 to close its normally open contacts 143 completing a circuit to the "down" solenoid 144. Energizing the solenoid 144 closes contact "DOWN–1" in the circuit to the door relay 138, to open the door 42 and hold it open, and also starts the motor 65. This causes the motor to rotate in a reverse direction to turn the elevator wheel 56 counterclockwise and thereby lengthen the chains 46 to lower the support 34. Simultaneously therewith, the solenoid 83 is actuated to introduce air pressure above the piston 75 and move the lever 58 downwardly to raise the position of the chains 46 and prevent the elevator wheel from lowering the support 34 onto the conveyor 25. When the tab 67 of the elevator wheel 56 hits the limit switch 69, it de-energizes "down" solenoid 144 and solenoid 83 which stops motor 65 and then exhausts air from above the piston 75. The rod 71 is pulled upwardly by the tension on chains 46 to cause piston 76 to force oil slowly through bleeder valve 79 to slowly lower the tong bar 23 onto the shuttle conveyor 25 for quenching or other treatment. The operator then moves switch SW–1 to the "out" position, causing motor 30 to drive chain 28 and rollers 26 in a manner to move the tong bar 23 outwardly until it interferes with light to photocell 145 to open switch 146 and stop motor 30. It has been found that a ¼" thick sheet of glass, eight feet high and ten feet wide, can be heated to 1200° F. in a cylindrically shaped furnace as above described while revolving it at a rate of 12 r.p.m. without producing any warpage on the eight foot dimension and only 1/16" on the ten foot dimension.

Rotation of the glass sheets, for example at 12 r.p.m., produces controlled convection currents within the furnace which also aid in keeping the temperature of the heating elements and the load uniform.

Figure 15:
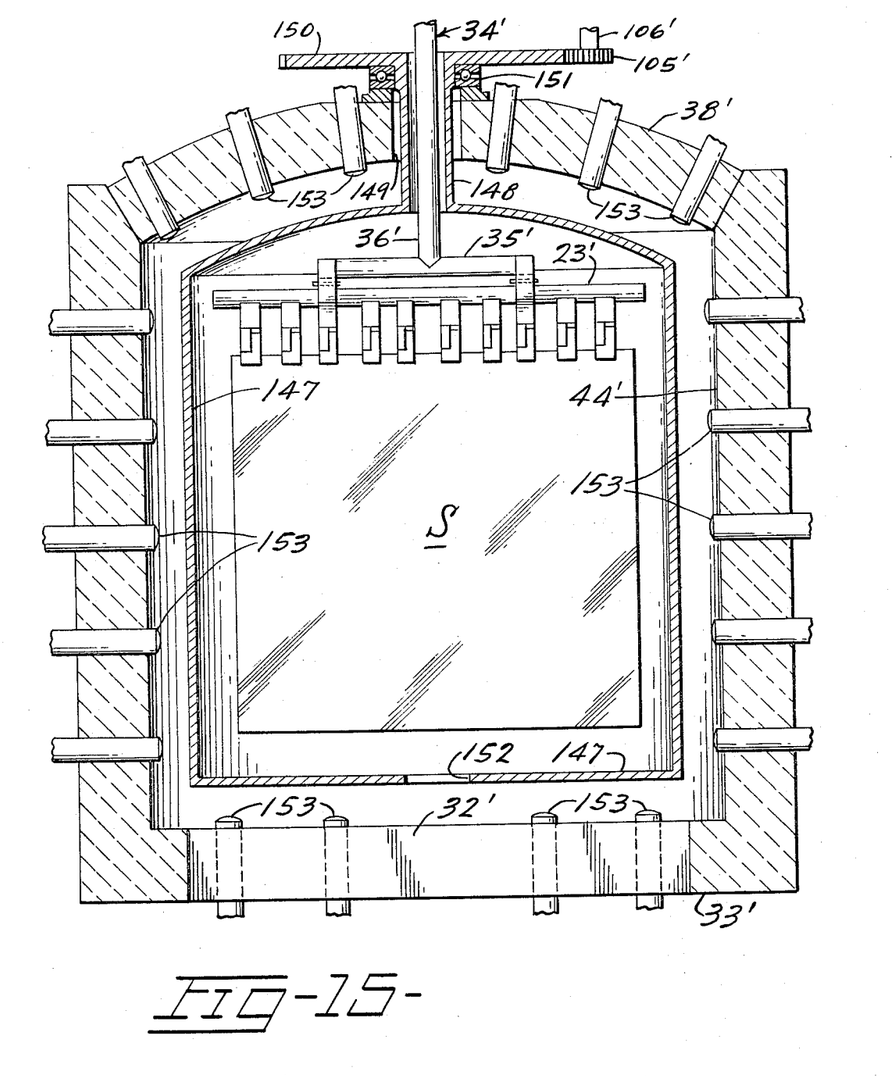
FIGURE 15 is a vertical sectional view of another embodiment of the invention.

FIGURE 15 shows another embodiment of the invention wherein all points of a cylindrical radiating heating surface of a sheet treating furnace are kept at substantially the same temperature in order to heat the sheet material uniformly. Those portions of the structure shown in FIGURE 15, which correspond with those of the previously described embodiment, are designated by a like reference numeral characterized further in that a prime mark is affixed thereto.

The furnace of FIGURE 15 comprises a domed top 38', a flat floor 33' having a diametrically extending opening 32' and a cylindrical wall 44'. The interior heating chamber is defined by a cylindrical heat radiating metallic shell 147. The shell 147 is suspended by a tubular hanger 148 which extends through an axial opening 149 in the domed top 38' and is welded or otherwise secured to a circular gear 150. The gear 150 rests on a bearing 151 and is engaged by a lower drive pinion 105' on the shaft 106' for rotating the shell 147. The shell 147 has a narrow opening 152 extending across its bottom.

A support 34' has a stem 36' which extends upwardly through the tubular hanger 148 and a cross bar 35' for supporting the tong bar 23'. In this embodiment, the support 34' and glass sheet are not rotated as in the earlier embodiment.

The space between the shell 147 and furnace brickwork may be heated electrically as in the previous embodiment, or by gas burners 153 mounted in the roof 38', the wall 44' and the floor 33' which are arranged in zones and controlled in the same manner as described for the previous embodiment. Means are used for stopping the rotation of the shell 147 to align the opening 152 with the opening 32' similar to those used in the earlier embodiment for stopping rotation of the support 34 in alignment with the opening 32.

We claim:

1. A method of heating a flat sheet of material and raising its temperature substantially uniformly, comprising the steps of positioning the sheet so that it is substantially completely surrounded by a heat radiating surface initially at a uniform elevated temperature, thereby causing the net rate of heat radiation per unit area of the surface to become non-uniform over the surface and the temperature of the surface to fall at a non-uniform rate over the surface, and supplying energy to different parts of the surface at different rates in such manner as to cause all parts of the surface first to approach a uniform lower instantaneous temperature and thereafter to rise together from the lower temperature towards the said elevated temperature.

2. A method according to claim 1 and the step of relatively rotating said heat radiating surface and said flat sheet of material while supplying energy to the different parts of the heat radiating surface.

3. A method according to claim 1 in which the energy is supplied to different parts of the surface at rates related to the rates of heat transfer from such parts of the surface to cause all parts of the surface first to approach the uniform lower instantaneous temperature and thereafter to rise together.

4. A method of operating a batch type furnace having a plurality of individually controlled heat radiating surface zones, comprising establishing the temperatures of all of said surface zones at a uniform elevated temperature, placing a sheet to be heated in said furnace and extending into heat transferral relationship relative to all of said surface zones, delivering energy to a selected one of said surface zones at a rate effective with reference to the heat transferring capacity of said selected surface zone and to the heat load to which said selected surface zone is subjected to cause the temperature of said selected surface zone initially to drop to a level below that of the remainder of said surface zones, controlling the delivery of energy to each of the remainder of said surface zones to cause the temperature of the respective surface zone to decrease until it reaches the instantaneous temperature of said selected surface zone, and thereafter comparing the temperature of each of said other surface zones with the temperature of said selected surface zone and controlling the flow of energy to each of said other surface zones at a rate effective to cause the temperatures of all of said surface zones to increase uniformly as the entire sheet to be heated approaches a desired temperature.

5. A method of producing uniform heat flow to the surface of a sheet to be heated, said method comprising positioning said sheet in a heat treating region having a plurality of zones all of said zones being at a uniform elevated temperature, each of which zones comprises an individually controlled heat radiating surface that extends in a closed path around said sheet, delivering energy to the radiating surface of a first one of said zones at a rate effective with reference to the heat transferring capacity of said first zone and to the heat load to which said first zone is subjected to cause the temperature of said first heat transferring surface initially to drop to a level below that of the remainder of said surfaces, controlling the delivery of energy to each of the remainder of said surfaces to cause the temperature of the respective surface to decrease until it reaches the instantaneous temperature of said first surface, thereafter controlling the flow of energy to each of said other surfaces at a rate effective to cause the temperatures of all of said surfaces to increase uniformly as the entire object to be heated approaches a desired temperature, and causing relative movement between said sheet and said surfaces effective to maintain said heat radiating surface of each of said zones at a substantially uniform temperature throughout said path.

6. Apparatus for uniformly heating sheet material comprising a furnace having a vertically extending heating chamber closed off by a generally dome shaped roof and a bottom wall, said bottom wall having a generally rectangular opening therethrough which extends generally diametrically of said bottom wall, an inverted T-shaped sheet support, means mounting said support for vertical movement in said chamber and for movement of the cross bar of said support through said rectangular opening between a position interiorly of said chamber at an upper level therein and a lower position below the bottom wall of said furnace, attachment means for hanging a sheet of material from said cross bar, a flexible pulling member one end of which is fixed to the upper end of the stem of said inverted T-shaped support and which extends upwardly by a distance at least as great as the spacing of the upper and lower positions of said cross bar of said support and the other end of which is fixed to anchor means, a rotatable member positioned adjacent said flexible pulling member, said rotatable member having a pair of spaced apart abutments positioned on opposite sides of said flexible pulling member and which double said pulling member back upon itself during 180° of rotation of said rotatable member to raise said cross bar of said inverted T-shaped support from said lower position to said upper position, means for causing said anchor means to hold said pulling member in a raised position as it lowers said support and for causing said anchor means to lower said pulling member gradually when said support reaches its lower position, said mounting means for said support comprising generally vertically extending guide rails positioned above said roof of said furnace, guide means fixed to said stem of said support for engaging said guide rails and for aligning said cross bar of said support with said generally rectangular opening in said floor as it is moved between said positions, the walls of said chamber having generally cylindrically extending and uniformly distributed heat radiating surfaces facing the inside of said chamber, means for producing relative rotation between said inverted T-shaped support and said heat radiating surfaces when said cross bar is in said upper position, said heat radiating surfaces being grouped into zones which are spaced vertically of said chamber with the zone having the greatest ratio of heat loss to heat input being the master zone and the other zones being slave zones, individual thermocouples for sensing the temperature of said heat radiating surfaces of each zone, the thermocouple of each slave zone being individually connected electrically in opposition to the thermocouple of said master zone to provide a control signal, and means responsive to the control signal for regulating the temperatures of said heat radiating surfaces of respective zones and effective to cause the temperature of the heat radiating surfaces of each slave zone to follow the temperature of the heat radiating surfaces of the master zone.

7. Apparatus for uniformly heating sheet material comprising a furnace having a vertically extending heating chamber closed off by a generally dome shaped roof and a bottom wall, said bottom wall having a generally rectangular opening therethrough which extends generally diametrically of said bottom wall, an inverted T-shaped sheet support, means mounting said support for vertical movement in said chamber and for movement of the cross bar of said support through said rectangular opening between a position interiorly of said chamber at an upper level therein and a lower position below the bottom wall of said furnace, attachment means for hanging a sheet of material from said cross bar, a flexible pulling member one end of which is fixed to the upper end of the stem of said inverted T-shaped support and which extends upwardly by a distance at least as great as the spacing of the upper and lower positions of said cross bar of said support and the other end of which is fixed to anchor means, a rotatable member positioned adjacent said flexible pulling member, said rotatable member having a pair of spaced apart abutments positioned on opposite sides of said flexible pulling member and which double said pulling member back upon itself during 180° of rotation of said rotatable member to raise said cross bar of said inverted T-shaped support from said lower position to said upper position, means for causing said anchor means to hold said pulling member in a raised position as it lowers said support and for causing said anchor means to lower said pulling member gradually when said support reaches its lower position, said mounting means for said support comprising generally vertically extending guide rails positioned above said roof of said furnace, guide means fixed to said stem of said support for engaging said guide rails and for aligning said cross bar of said support with said generally rectangular opening in said floor as it is moved between said positions, the walls of said chamber having uniformly distributed heat radiating surfaces facing the inside of said chamber, means for rotating said inverted T-shaped support when said cross bar is in said upper position, said heat radiating surfaces being grouped into zones which are subject to different heat loads, with the zone subject to the greatest heat load being the master zone and the other zones being slave zones, individual thermocouples for sensing the temperature of said heat radiating surfaces of each zone, the thermocouple of each slave zone being individually connected electrically in opposition to the thermocouple of said master zone to provide a control signal, and means responsive to the control signal for regulating the temperatures of said heat radiating surfaces of respective zones and effective to cause the temperature of the heat radiating surfaces of each slave zone to follow the temperature of the heat radiating surfaces of the master zone.

8. Apparatus for uniformly heating sheet material comprising a furnace having a vertically extending heating chamber closed off by a roof and a bottom wall, said bottom wall having a generally rectangular opening therethrough which extends across said bottom wall, an inverted T-shaped sheet support, means mounting said support for vertical movement in said chamber and for movement of the cross bar of said support through said rectangular opening between a position interiorly of said chamber at an upper level therein and a lower position below the bottom wall of said furnace, attachment means for hanging a sheet of material from said cross bar, a flexible pulling member one end of which is fixed to the upper end of the stem of said inverted T-shaped support and which extends upwardly by a distance at least as great as the spacing of the upper and lower positions of said cross bar of said support and the other end of which is fixed to anchor means, and a rotatable member positioned adjacent said flexible pulling member, said rotatable member having a pair of spaced apart abutments positioned on opposite sides of said flexible pulling member and which double said pulling member back upon itself during 180° of rotation of said rotatable member to raise said cross bar of said inverted T-shaped support from said lower position to said upper position.

9. Apparatus for uniformly heating sheet material comprising a furnace having a vertically extending heating chamber closed off by a roof and a bottom wall, said bottom wall having a generally rectangular opening therethrough which extends across said bottom wall, an inverted T-shaped sheet support, means mounting said support for vertical movement in said chamber and for movement of the cross bar of said support through said rectangular opening between a position interiorly of said chamber at an upper level therein and a lower position below the bottom wall of said furnace, attachment means for hanging a sheet of material from said cross bar, a flexible pulling member one end of which is fixed to the upper end of the stem of said inverted T-shaped support and which extends upwardly by a distance at least as great as the spacing of the upper and lower positions of said cross bar of said support and the other end of which is fixed to anchor means, a rotatable member positioned adjacent said flexible pulling member, said rotatable member having a pair of spaced apart abutments positioned on opposite sides of said flexible pulling member and which double said pulling member back upon itself during 180° of rotation of said rotatable member to raise said cross bar of said inverted T-shaped support from said lower position to said upper position, and means for causing said anchor means to hold said pulling member in a raised position as it lowers said support and for causing said anchor means to lower said pulling member gradually when said support reaches its lower position.

References Cited by the Examiner
UNITED STATES PATENTS

| | | | |
|---|---|---|---|
| 1,603,368 | 10/1926 | Weil | 263—7 X |
| 2,370,381 | 2/1945 | Vaughan. | |
| 2,493,135 | 1/1950 | Gruetjen | 266—5 X |
| 2,518,996 | 8/1950 | Peckham | 236—15 |
| 2,526,491 | 10/1950 | Liston et al. | 136—4 |
| 2,676,195 | 4/1954 | Hart | 136—4 |
| 2,792,211 | 5/1957 | Kennedy | 263—7 X |
| 2,917,871 | 12/1959 | Atkeson | 65—161 |
| 2,983,502 | 5/1961 | McClure | 263—40 |
| 2,998,195 | 8/1961 | Kahn | 263—15 |
| 3,159,387 | 12/1964 | Campbell et al. | 263—40 |

FREDERICK L. MATTESON, JR., *Primary Examiner.*

D. A. TAMBURRO, *Assistant Examiner.*